United States Patent
Meng et al.

(10) Patent No.: US 12,190,445 B2
(45) Date of Patent: Jan. 7, 2025

(54) HIGH-PRECISION MAP CONSTRUCTION METHOD, APPARATUS AND ELECTRONIC DEVICE

(71) Applicant: Beijing Baidu Netcom Science Technology Co., Ltd., Beijing (CN)

(72) Inventors: Zhangwei Meng, Beijing (CN); Hao Li, Beijing (CN); Gen Li, Beijing (CN); Jiacheng Ding, Beijing (CN)

(73) Assignee: Beijing Baidu Netcom Science Technology Co., Ltd., Beijing (CN)

(*) Notice: Subject to any disclaimer, the term of this patent is extended or adjusted under 35 U.S.C. 154(b) by 80 days.

(21) Appl. No.: 17/974,416

(22) Filed: Oct. 26, 2022

(65) Prior Publication Data
US 2023/0048643 A1  Feb. 16, 2023

(30) Foreign Application Priority Data
Mar. 24, 2022 (CN) .......................... 202210294765.5

(51) Int. Cl.
  *G06T 17/05* (2011.01)
  *G06T 17/20* (2006.01)
  *G06T 19/20* (2011.01)

(52) U.S. Cl.
  CPC .............. *G06T 17/05* (2013.01); *G06T 17/20* (2013.01); *G06T 19/20* (2013.01); *G06T 2210/12* (2013.01); *G06T 2219/2021* (2013.01)

(58) Field of Classification Search
  CPC ......... G06T 17/05; G06T 17/20; G06T 19/20; G06T 2210/12
  USPC ....................................................... 345/418
  See application file for complete search history.

(56) References Cited

U.S. PATENT DOCUMENTS

| 2017/0039436 A1* | 2/2017 | Chen ..................... G06V 10/454 |
| 2018/0322708 A1* | 11/2018 | Luccin .................... G06T 19/20 |
| 2023/0147594 A1* | 5/2023 | Xia ..................... G01C 21/3815 |
| | | 701/450 |

FOREIGN PATENT DOCUMENTS

| CN | 110160502 A | 8/2019 |
| CN | 112258568 A | 1/2021 |
| CN | 112270272 A | 1/2021 |
| CN | 112488010 A | 3/2021 |
| CN | 113984037 A | 1/2022 |

(Continued)

OTHER PUBLICATIONS

"An empirical evaluation of deep learning on highway driving" B Huval, et al., arxiv.org, 2015.*

*Primary Examiner* — Javid A Amini
(74) *Attorney, Agent, or Firm* — Knobbe, Martens, Olson & Bears, LLP

(57) ABSTRACT

A high-precision map construction method, apparatus, and electronic device are provided. The method can include: displaying a first color image corresponding to a first track point; according to a first color sub-image and a depth image corresponding to the first track point, obtaining point cloud data corresponding to the first sub-color image, wherein the first sub-color image is a sub-image corresponding to an element to be added in the first color image, and the element to be added is an element to be added in a high-precision map for display; extracting a bounding box corresponding to the point cloud data; and generating a newly-added three-dimensional element according to the bounding box in the high-precision map.

20 Claims, 8 Drawing Sheets

(56) References Cited

FOREIGN PATENT DOCUMENTS

CN 114004882 A 2/2022

* cited by examiner

HIGH-PRECISION MAP CONSTRUCTION METHOD, APPARATUS AND ELECTRONIC DEVICE

CROSS-REFERENCE TO RELATED APPLICATIONS

The present application claims the priority of Chinese Patent Application No. 202210294765.5, titled "HIGH-PRECISION MAP CONSTRUCTION METHOD, APPARATUS AND ELECTRONIC DEVICE," filed on Mar. 24, 2022, the disclosure of which is incorporated by reference herein in its entirety.

TECHNICAL FIELD

The present disclosure relates to the field of computer technology, and more particularly, to the field of positioning technology.

BACKGROUND

In map data generating, road-level and lane-level data generation is changed to high-precision map data generation.

SUMMARY

The present disclosure provides a high-precision map construction method, apparatus, device, and storage medium.

Some embodiments of the present disclosure provide a high-precision map construction method including:
  displaying a first color image corresponding to a first track point, wherein the first track point is a track point selected by a preset selection operation, the track point is a point on an actual road, and a color image corresponding to the track point is a color image captured at the track point;
  according to a first color sub-image and a depth image corresponding to the first track point, obtaining point cloud data corresponding to the first sub-color image, wherein the first sub-color image is a sub-image corresponding to an element to be added in the first color image, and the element to be added is an element to be added in a high-precision map for display;
  extracting a bounding box corresponding to the point cloud data; and
  generating a newly-added three-dimensional element according to the bounding box in the high-precision map.

Some embodiments of the present disclosure provide a high-precision map construction apparatus including:
  a track point selecting module, configured to display a first color image corresponding to a first track point, wherein the first track point is a track point selected by a preset selection operation, the track point is a point on an actual road, and a color image corresponding to the track point is a color image captured at the track point;
  a sub-image acquiring module, configured to, according to a first color sub-image and a depth image corresponding to the first track point, obtain point cloud data corresponding to the first sub-color image, wherein the first sub-color image is a sub-image corresponding to an element to be added in the first color image, and the element to be added is an element to be added in a high-precision map for display;
  a bounding box generating module, configured to extract a bounding box corresponding to the point cloud data; and
  an element generating module, configured to generate a newly-added three-dimensional element according to the bounding box in the high-precision map.

It is to be understood that the description in this section is not intended to identify key or critical features of the embodiments of the disclosure, nor is it intended to limit the scope of the disclosure. Other features of the present disclosure will become readily apparent from the following description.

BRIEF DESCRIPTION OF THE DRAWINGS

The drawings are for a better understanding of the present disclosure and do not constitute a limitation of the present disclosure, where.

DETAILED DESCRIPTION OF EMBODIMENTS

The following description of exemplary embodiments of the present disclosure, taken in conjunction with the accompanying drawings, includes various details of embodiments of the present disclosure to facilitate understanding, and is to be considered as exemplary only. Accordingly, one of ordinary skill in the art will recognize that various changes and modifications may be made to the embodiments described herein without departing from the scope and spirit of the disclosure. Also, for clarity and conciseness, descriptions of well-known functions and structures are omitted from the following description.

For ease of description, embodiments of the present disclosure are described below with reference to an operator issuing an instruction to an execution body. In the present disclosure, it is the execution body that issues an instruction to the execution body itself according to an algorithm calculation result, or the instruction may be issued by another electronic device. It is understood that in the present disclosure, it is not necessarily to set a limit in which the instruction must be issued by the operator to the execution body.

Figure 1:
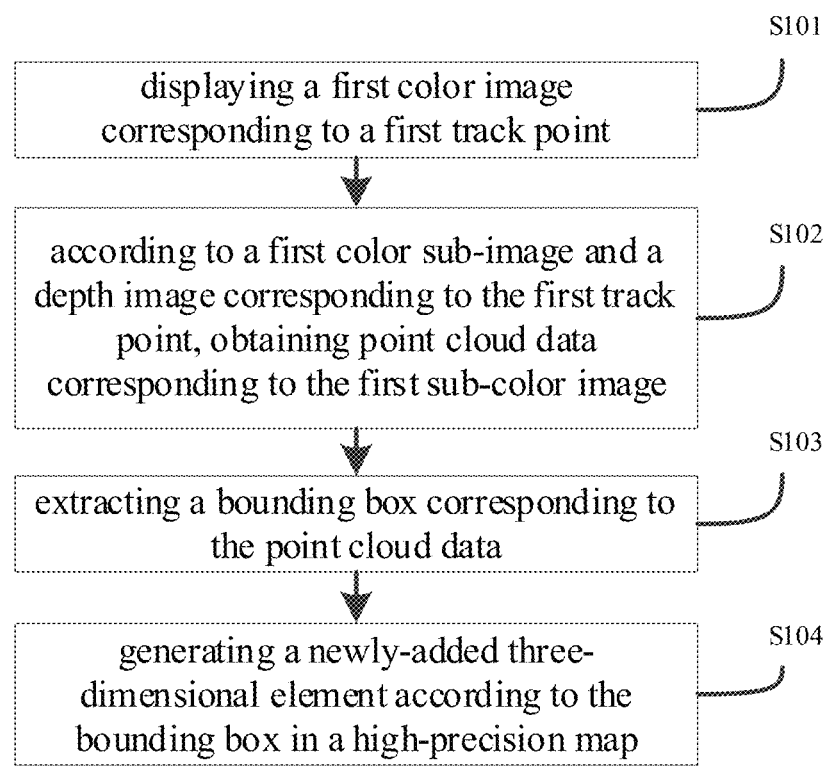
FIG. 1 is a schematic flow diagram of a high-precision map construction method according to the present disclosure.

In a development process from low-precision map construction to high-precision map construction, a data model tool used to construct a map is also upgraded from an original two-dimensional model tool to a three-dimensional model tool. Accordingly, in the map construction, top-view display with a conventional fixed angle of view is upgraded to three-dimensional space display. For various kinds of data involved in the map construction process, such as data for representing roads and data for representing red and green lamps, display of these data is upgraded from being displayed in a two-dimensional space to being displayed in the three-dimensional space. Further, generating of these data is upgraded from being performed in the two-dimensional space to being performed in the three-dimensional space. Therefore, operations involved in the generation of these data are changed from translation, zooming in/out, and rotation of points, lines, and faces on a plane to the translation, zooming in/out, and rotation of points, lines, faces, and three-dimensional bodies in the three-dimensional space. Main data on which the map is constructed is also changed from photographs to point cloud data. Specifically, in the process of constructing the high-precision map, it is generally necessary to display elements and the point cloud data in the high-precision map in the three-dimensional space. Then the operator adds an element to the high-precision map according to a positional relationship between the elements and the point cloud data in the three-dimensional space. An element is an object in an actual road corresponding to the high-precision map, such as a road sign and a traffic light. However, a data amount of the point cloud data is increased by a several tens of times as compared with that of images. Therefore, in constructing the high-precision map, because the data amount of the point cloud data is large, a data loading time is long, and a displaying time of the point cloud data is long, a high-precision map construction efficiency is low. Based on this, the present disclosure provides a high-precision map construction method. As shown in FIG. 1, the method includes S101 to S104.

S101, displaying a first color image corresponding to a first track point.

S102, according to a first color sub-image and a depth image corresponding to the first track point, obtaining point cloud data corresponding to the first sub-color image.

S103, extracting a bounding box corresponding to the point cloud data.

S104. generating a newly-added three-dimensional element according to the bounding box in a high-precision map.

In this embodiment, the first color image corresponding to the first track point is displayed, and the depth image having a mapping relationship with the first color sub-image is selected. The first color sub-image is a sub-image corresponding to an element to be added in the first color image, and the element to be added is an element to be added to a high-precision map for display. Therefore, the point cloud data corresponding to the first color sub-image can be obtained based on the mapping relationship between the depth image and the first color sub-image. It can be understood that since the first color sub-image corresponds to the element to be added, and the point cloud data corresponds to the first color sub-image, the point cloud data is also point cloud data corresponding to the element to be added, and the bounding box obtained according to the point cloud data is also a bounding box corresponding to the element to be added. According to the bounding box, the newly-added three-dimensional element corresponding to the element to be added in the high-precision map can be accurately generated. It can be seen that according to the embodiment, after displaying the first color image corresponding to the first track point, it is only required, in response to selecting an image by a box, to load a small amount of point cloud data corresponding to the element to be added, the newly-added three-dimensional element to be added can be directly generated in the high-precision map according to the small amount of point cloud data, avoiding loading all point cloud data in the first color image, and increasing a construction efficiency of the high-precision map.

In S101, the first track point is a track point selected by a preset selection operation, the track point is a point on an actual road, and a color image corresponding to the track point is a color image captured at the track point.

In the high-precision map construction method provided in the present disclosure, images are captured in advance at different track points in each actual road to obtain color images corresponding to respective track points. For example, a cross intersection in the actual road is used as a track point, and an image captured at the cross intersection is used as a color image corresponding to the track point. Alternatively, a location in the actual road at which an image of a landmark building can be captured may be used as a track point, and the image captured at the location may be used as a color image corresponding to the track point. The operator may select a track point to which an element needs to be added on a construction interface of a construction program of a high-precision map according to requirements. As an example, the construction program displays each actual road and an identifier corresponding to each track point through the construction interface, and the operator selects a track point by clicking on the identifier corresponding to each track point. The construction program displays the first color image corresponding to the first track point at the construction interface in response to the first track point being selected by the operator, so that the operator can view a road image corresponding to the track point.

In S102, the first color sub-image is a sub-image corresponding to the element to be added in the first color image, and the element to be added is an element to be added to the high-precision map for display.

The operator may select, in the displayed first color image and by a box, an element to be added to the high-precision map, that is, the element to be added, which may be an element that has not been added to the high-precision map, such as a road sign, a traffic light, a speed limit sign, or the like. The operation of box selection may be performed by a long-press on the left key of a mouse to pull down obliquely on the interface for displaying the first color image in the construction program, or may be performed by drawing an outline of the element to be added, which is not limited by the present disclosure. The construction program can obtain the first color sub-image corresponding to the element to be added selected by the operator in response to the box selection operation of the operator, and determine the point cloud data corresponding to the first color sub-image based on the first color sub-image and the depth image corresponding to the first track point. The point cloud data is the point cloud data corresponding to the element to be added.

In this embodiment of the present disclosure, the depth image of the first track point and the first color image are images of the same actual space. Illustratively, if the first color image is obtained by shooting an intersection, the depth image of the first track point is the depth image of the intersection, and therefore the depth image of the first track point and the first color image have a correspondence. Since the depth image is an image including a color image and sparse point cloud data matched with the color image, after obtaining the first color sub-image included in the first color image, the construction program may obtain point cloud data corresponding to the first color sub-image based on the depth image of the first track point.

The point cloud data included in the depth image are acquired by collecting. In this disclosure, point cloud data acquired directly by collecting is referred to as an original point cloud. In a possible embodiment, during collecting the original point cloud data, due to factors such as an equipment precision, operator experience, and environmental, some noise may appear in the collected original point cloud data. In addition, outliers may also appear in the original point cloud data due to occlusion. Therefore, filtering can be performed on the original point cloud data corresponding to the first color sub-image to obtain the point cloud data of the element to be added more accurately. Specifically. commonly-used filtering methods for the point cloud data may include direct filtering, voxel filtering, bilateral filtering, Gaussian filtering, and the like. The point cloud data may be filtered by using one or more of the above filtering methods in the present disclosure, which is not limited in the present disclosure. By using this embodiment, an accuracy of the point cloud data can be improved, an accuracy of the newly-added three-dimensional element can be improved, and an accuracy of the high-precision map construction can be improved.

Here, in S103, the bounding box corresponding to the point cloud data is a geometry including all vectors in the point cloud data. Therefore, the bounding box is also referred to as a circumscribed geometry. The bounding box of the point cloud data can be determined by any bounding box algorithm. The bounding box algorithm is an algorithm for solving an optimal bounding space of a discrete point set. A basic idea of the bounding box algorithm is to approximately represent a complex geometric object with a bounding box of a slightly larger size and simple properties. Commonly-used bounding box algorithms include an Axis-Aligned Bounding Box (AABB), a bounding ball algorithm, an Oriented Bounding Box (OBB) algorithm, and a Fixed Directions Hulls (FDH) algorithm. The present disclosure does not limit the bounding box generation algorithm for point cloud data.

In S104, the bounding box corresponding to the point cloud data is also a bounding box corresponding to the element to be added. It can be understood that the point cloud data is a group of vectors in a three-dimensional coordinate system. Therefore, the bounding box corresponding to the point cloud data is a three-dimensional bounding box. The construction program can generate a newly-added three-dimensional element for the high-precision map according to the obtained three-dimensional bounding box. The newly-added three-dimensional element is also a three-dimensional element, corresponding to the element to be added, in the high-precision map in the first color image. As described above, the bounding box corresponding to the point cloud data is three-dimensional. If the bounding box is displayed in the two-dimensional first color image, a plane shape corresponding to the bounding box can be determined according to the depth image, so that the bounding box is displayed as a polygon in the first color image.

Figure 2:
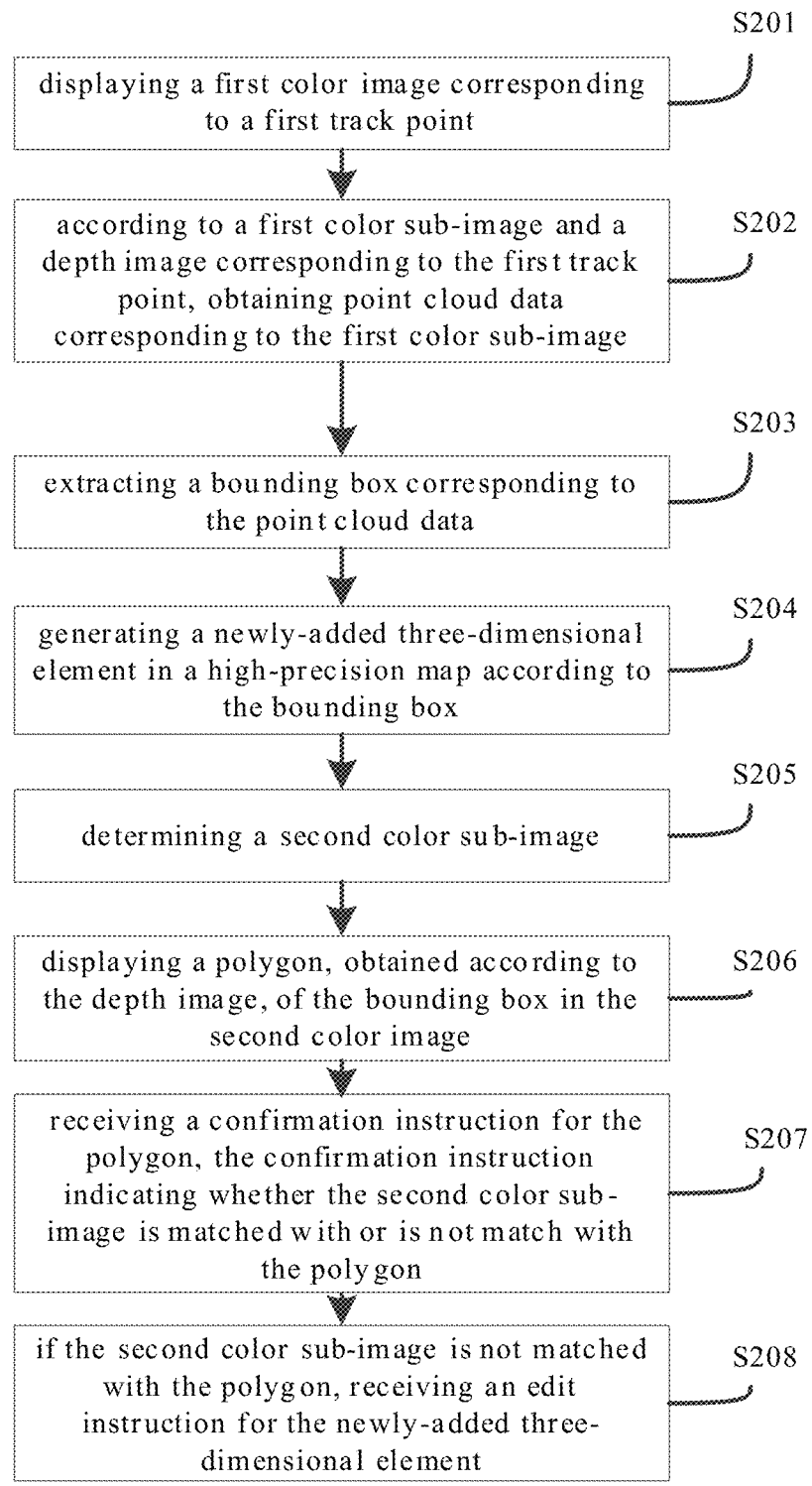
FIG. 2 is a schematic diagram of a high-precision map construction method according another embodiment to the present disclosure.

In the construction of an actual high-precision map, various features of the element to be added may not be accurately reflected only by a color image corresponding to one track point. Therefore, the newly-added three-dimensional element generated by the color image based on one track point may not be accurate enough. Based on this, the present disclosure also provides a high-precision map construction method. As shown in FIG. 2, the method includes S201 to S208.

S201, displaying a first color image corresponding to a first track point.

This step is identical with S101. For details, reference can be made to the related description in S101, which will not be repeated here.

S202. according to a first color sub-image and a depth image corresponding to the first track point, obtaining point cloud data corresponding to the first color sub-image.

This step is identical with S102. For details, reference can be made to the related description in S102, which will not be repeated here.

S203. extracting a bounding box corresponding to the point cloud data.

This step is identical with S103. For details, reference can be made to the related description in S101, which will not be repeated here.

S204. generating a newly-added three-dimensional element in a high-precision map according to the bounding box.

This step is identical with S104. For details, reference can be made to the related description in S104, which will not be repeated here.

S205, determining a second color sub-image.

S206, displaying a polygon, obtained according to the depth image, of the bounding box in the second color image.

S207, receiving a confirmation instruction for the polygon, the confirmation instruction indicating whether the second color sub-image is matched with or is not match with the polygon.

S208, if the second color sub-image is not matched with the polygon, receiving an edit instruction for the newly-added three-dimensional element.

In S205, the second color sub-image is an image, displayed in a second color image corresponding to the second track point, of the element to be added, and the second track point is a track point adjacent to the first track point.

The second track point may be a track point immediately adjacent to the first track point, or may be a track point separated from the first track point by several track points, provided that the second track point satisfies a condition in which an image of the element to be added is included in the second color image corresponding to the second track point. It will be appreciated that the second color image includes the image of the element to be added, and therefore, the construction program can recognize the image corresponding to the element to be added in the second color image as the second color sub-image.

In S206, as described in step S104, the bounding box may be displayed as a polygon in the first color image according to the depth image corresponding to the first track point. Therefore, the bounding box may also be displayed as a polygon in the second color image according to the depth image corresponding to the second track point. It will be appreciated that the newly-added three-dimensional element is generated according to the bounding box, and therefore the polygon corresponding to the bounding box is also a polygon corresponding to the newly-added three-dimensional element in the second color image.

Here, in S207, the polygon corresponding to the newly-added three-dimensional element has been displayed in the second color image, the operator can view the polygon on the second color image in the construction program, and the second color sub-image corresponding to the element to be added has also been determined in the second color image. As such, the operator can compare whether the polygon corresponding to the newly-added three-dimensional element generated in the first color image is matched with the second color sub-image. It can be understood that whether the polygon is matched with the second color sub-image can be determined according to whether a size of the polygon is matched with that of the second color sub-image, whether a shape of the polygon is identical with that of the second color sub-image, or the like. After the operator determines whether the polygon is matched with the second color sub-image, the operator may send a corresponding instruction to the construction program by means of key input or voice input in the construction program. The method for receiving an instruction of the construction program is not limited in the present disclosure.

In step S208, if the construction program receives an instruction indicating that the second color sub-image is not matched with the polygon, it indicates that the polygon is not matched with the second color sub-image in shape and/or size, and further indicates that the newly-added three-dimensional element generated in the first color image is incorrect and cannot accurately represent features of the to-be-added element. Therefore, the newly-added three-dimensional element needs to be edited and modified. The construction program can display a page for receiving an editing instruction for the newly-added three-dimensional element, so that the operator further modifies the newly-added three-dimensional element according to the editing instruction for the newly-added three-dimensional element.

Accordingly, if the construction program receives an instruction indicating that the second color sub-image is matched with the polygon, it indicates that the polygon is matched with the second sub-color image in shape or size, and further indicates that the newly-added three-dimensional element generated in the first color image is correct, so that the features of the element to be added can be accurately represented, and the construction program will not receive the editing instruction for the newly-added three-dimensional element.

With this embodiment, the newly-added three-dimensional element generated in the first color image can be detected by the second color image, so as to determine whether the newly-added three-dimensional element is generated correctly, thereby improving the accuracy of high-precision map construction.

Figure 3:
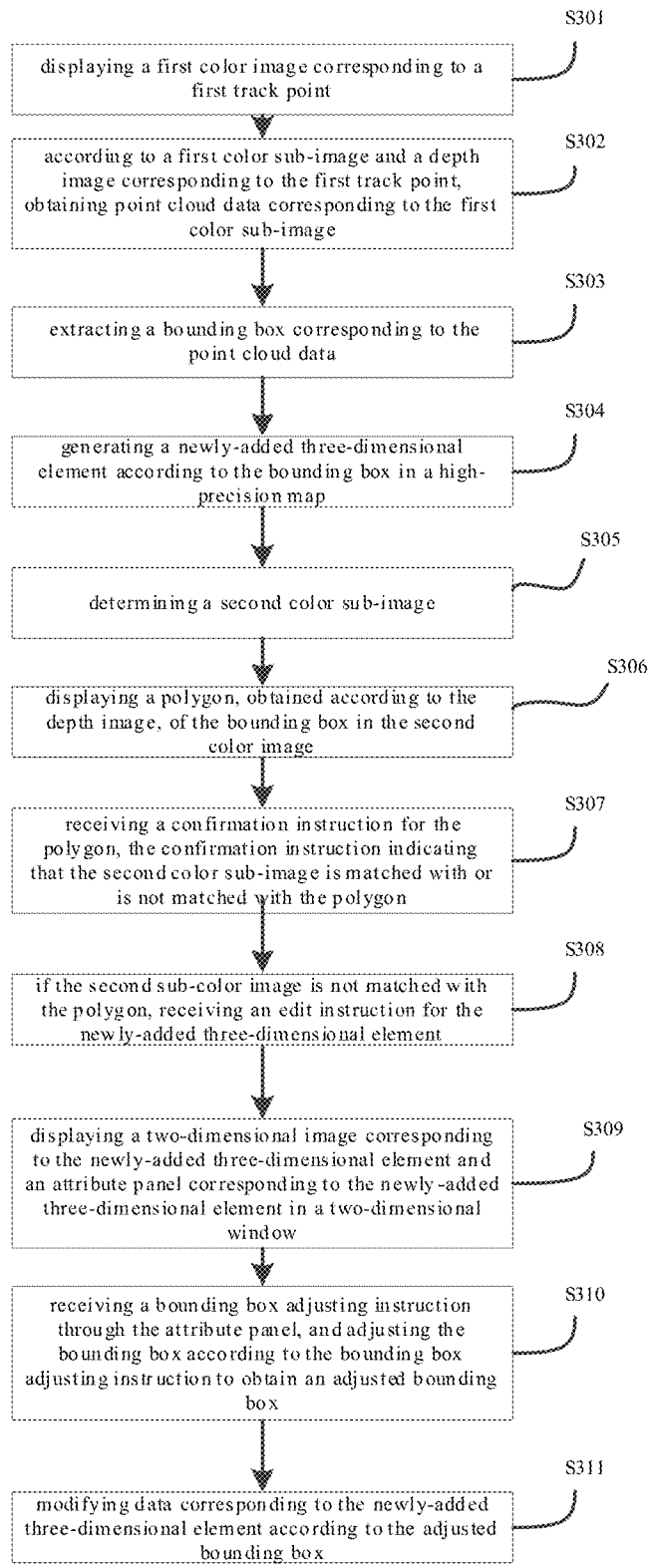
FIG. 3 is a schematic diagram of a high-precision map construction method according to another embodiment the present disclosure.

As described above, if a newly-added three-dimensional element is generated incorrectly, the newly-added three-dimensional element needs to be edited. However, because the newly-added three-dimensional element is a three-dimensional image, a large amount of data needs to be loaded if the three-dimensional image is directly edited, so that an efficiency is low. Based on this, the present disclosure further provides a high-precision map construction method. As shown in FIG. 3, the method includes S301 to S311.

S301, displaying a first color image corresponding to a first track point.

This step is identical with S101. For details, reference can be made to the related description in S101, which will not be repeated here.

S302, according to a first color sub-image and a depth image corresponding to the first track point, obtaining point cloud data corresponding to the first color sub-image.

This step is identical with S102. For details, reference can be made to the related description in S102, which will not be repeated here.

S303, extracting a bounding box corresponding to the point cloud data.

This step is identical with S103. For details, reference can be made to the related description in S103, which will not be repeated here.

S304, generating a newly-added three-dimensional element according to the bounding box in a high-precision map.

This step is identical with S104. For details, reference can be made to the related description in S104, which will not be repeated here.

S305, determining a second color sub-image.

This step is identical with S205. For details, reference can be made to the related description in S205, which will not be repeated here.

S306, displaying a polygon, obtained according to the depth image, of the bounding box in the second color image.

This step is identical with S206. For details, reference can be made to the related description in S206, which will not be repeated here.

S307, receiving a confirmation instruction for the polygon, the confirmation instruction indicating that the second color sub-image is matched with or is not matched with the polygon.

This step is identical with S207. For details, reference can be made to the related description in S207, which will not be repeated here.

S308, if the second sub-color image is not matched with the polygon, receiving an edit instruction for the newly-added three-dimensional element.

This step is identical with S208. For details, reference can be made to the related description in S208.

S309, displaying a two-dimensional image corresponding to the newly-added three-dimensional element and an attribute panel corresponding to the newly-added three-dimensional element in a two-dimensional window.

S310, receiving a bounding box adjusting instruction through the attribute panel, and adjusting the bounding box according to the bounding box adjusting instruction to obtain an adjusted bounding box.

S311, modifying data corresponding to the newly-added three-dimensional element according to the adjusted bounding box.

In S309, the two-dimensional window is a two-dimensional map window corresponding to the high-precision map.

The two-dimensional window may be a map window for displaying a top view of the high-precision map, a map window for displaying a front view of the high-precision map, and the like, which is not limited in the present disclosure. For ease of description, in the following, the two-dimensional window for displaying the top view is used as an example. The two-dimensional window can display a top-view angle of each newly-added three-dimensional element in a high-precision map, such as a top-view angle of a road, a road sign, a building, and the like, and display an attribute panel corresponding to each newly-added three-dimensional element, so that an operator can adjust attribute data, such as the bounding box data, of the newly-added three-dimensional element so as to adjust the corresponding newly-added three-dimensional element.

In S310, the adjusted bounding box is a bounding box corresponding to a positional relationship of the point cloud data in a three-dimensional window, and the three-dimensional window is a window including three-dimensional images corresponding to respective elements in the high-precision map.

The three-dimensional window may display the three-dimensional images and data corresponding to the respective elements in the high-precision map, and may also include point cloud data and a bounding box corresponding to each newly-added three-dimensional element. The point cloud data and the bounding box corresponding to each newly-added three-dimensional element can be displayed in the three-dimensional window: The operator can input a related instruction through the attribute panel displayed in the two-dimensional window according to the position relationship between the bounding box and the point cloud data displayed in the three-dimensional window, and adjust the related data of the bounding box so that a position of the bounding box coincides with that of the point cloud data. It can be understood that the point cloud data is obtained by actual collecting, the bounding box is generated based on the point cloud data, and the newly-added three-dimensional element is generated based on the bounding box. Therefore, the newly-added three-dimensional data can be actually adjusted by adjusting the bounding box when adjusting the newly-added three-dimensional element. Because the point cloud data is accurate data obtained by actual collecting, the operator can adjust the bounding box based on the point cloud data when adjusting the bounding box, and send a bounding box adjusting instruction to the construction program through the two-dimensional window so that the construction program continuously adjusts the data of the bounding box according to the bounding box adjusting instruction, such as a size, a position, and a direction of the bounding box, until the position of the bounding box in the three-dimensional window coincides with the position of the point cloud data, thereby obtaining the adjusted bounding box. The position of the bounding box coinciding with the position of the point cloud data refers to the bounding box enclosing all vectors in the point cloud data, and also refers to the bounding box enclosing vectors, occupying a certain proportion greater than a threshold, in the point cloud data.

In S311, it can be understood that the adjusted bounding box is an accurate bounding box conforming to the features of the actual element to be added, and the construction program can modify corresponding data of the newly-added three-dimensional element according to the adjusted bounding box, thereby obtaining an accurate newly-added three-dimensional element.

According to the embodiment, the bounding box can be modified in the two-dimensional window until the bounding box coincides with the point cloud data. After modification, the newly-added three-dimensional element is modified by rendering the newly-added three-dimensional element according to the adjusted bounding box. Compared with modifying the newly-added three-dimensional element by directly performing dragging, rotating, and zooming in/out in the three-dimensional window, time is saved, further improving the high-precision map construction efficiency.

Figure 4:
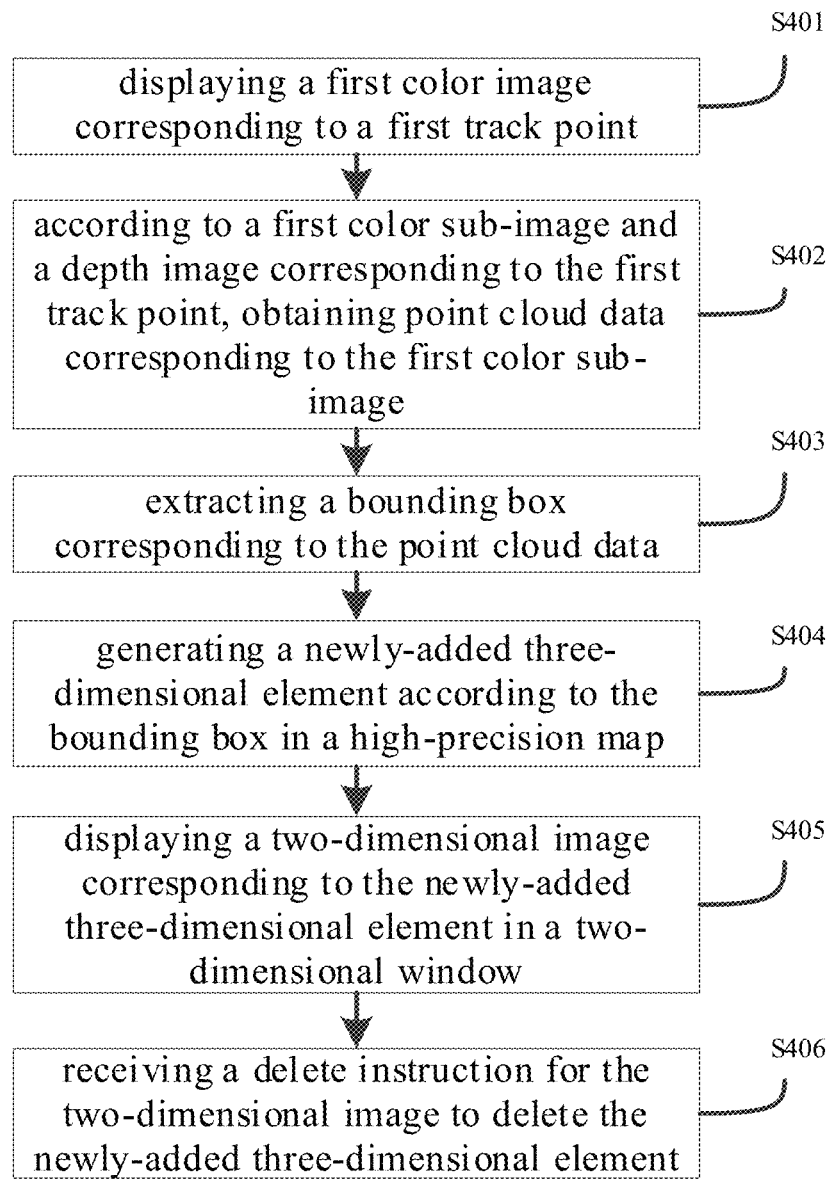
FIG. 4 is a schematic diagram of a high-precision map construction method according to another embodiment the present disclosure.

In practice, due to urban planning and construction, roads, buildings, and the like are often reconstructed. Thus, related elements corresponding to the roads in the high-precision map of the city also need to be accordingly deleted. Generally, when an element is required to be deleted from the high-precision map, a newly-added element needs to be selected and deleted in the three-dimensional window. However, displaying various elements in the three-dimensional window requires to load a large amount of three-dimensional data, thereby reducing the construction efficiency of the high-precision map. Based on this, the present disclosure further provides a high-precision map construction method. As shown in FIG. 4, the method includes S401 to S406.

S401, displaying a first color image corresponding to a first track point.

This step is identical with S101. For details, reference can be made to the related description in S101, which will not be repeated here.

S402, according to a first color sub-image and a depth image corresponding to the first track point, obtaining point cloud data corresponding to the first color sub-image.

This step is identical with S102. For details, reference can be made to the related description in S102, which will not be repeated here.

S403, extracting a bounding box corresponding to the point cloud data.

This step is identical with S103. For details, reference can be made to the related description in S103, which will not be repeated here.

S404, generating a newly-added three-dimensional element according to the bounding box in a high-precision map.

This step is identical with S105. For details, reference can be made to the related description in S105, which will not be repeated here.

S405, displaying a two-dimensional image corresponding to the newly-added three-dimensional element in a two-dimensional window.

S406, receiving a delete instruction for the two-dimensional image to delete the newly-added three-dimensional element.

In S405, the two-dimensional window is a two-dimensional map window corresponding to the high-precision map.

As described in the previous step S309, the two-dimensional window is a window that can display a two-dimensional map corresponding to the high-precision map. For example, the two-dimensional window displays a top view angle of the high-precision map, in which the two-dimensional window can display a top view image of each newly-added three-dimensional element. Therefore, the operator can select a top-view image corresponding to the newly-added three-dimensional element to be deleted from the two-dimensional window. Illustratively, if the newly-added three-dimensional element is a cubic-like building, the two-dimensional image displayed in the two-dimensional window should be a square image. If the newly-added three-dimensional element is a road sign with a certain thickness and a circular front view, the two-dimensional image displayed in the two-dimensional window should be a rectangular image.

Here, in S406, the two-dimensional window displays a two-dimensional image corresponding to each newly-added three-dimensional element in the high-precision map, so that the operator can directly select the newly-added three-dimensional element to be deleted through the two-dimensional window and input a delete instruction for the two-dimensional image. As such, the construction program can obtain the delete instruction for a specified newly-added three-dimensional element, and delete a corresponding newly-added three-dimensional element in the two-dimensional window in response to the delete instruction.

With this embodiment, it is possible to directly delete the newly-added three-dimensional elements that are not needed in the two-dimensional window. Compared with deleting the newly-added three-dimensional elements in the three-dimensional window, a data loading time is saved, thus being more convenient, and improving the high-precision map construction efficiency.

Figure 5:
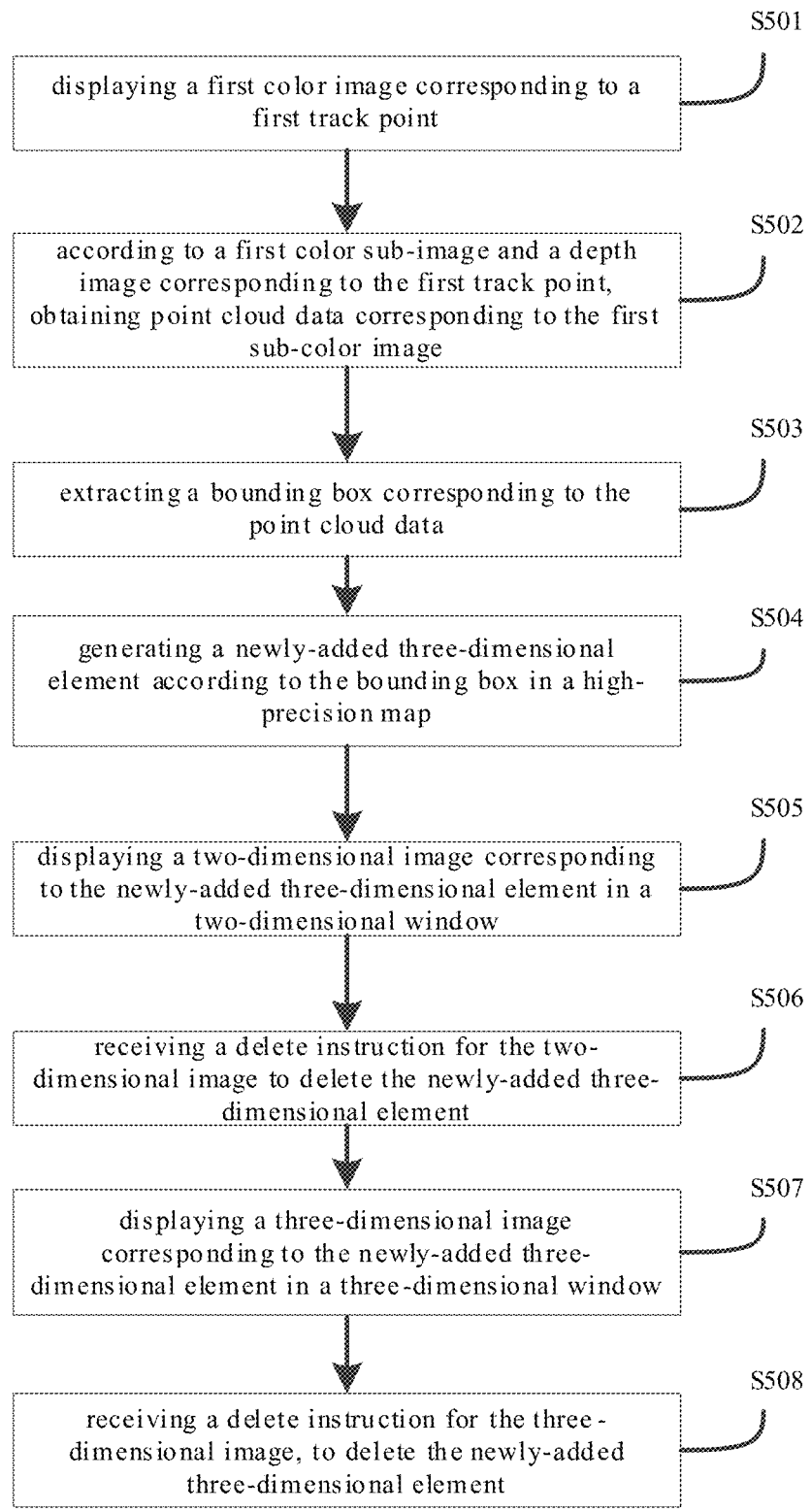
FIG. 5 is a schematic diagram of a high-precision map construction method according to another embodiment the present disclosure.

When the newly-added three-dimensional element is only deleted in the two-dimensional window; the two-dimensional image corresponding to the newly-added three-dimensional element may be blocked by other elements and cannot be selected. Taking the two-dimensional window presenting a top view angle of the high-precision map as an example, if a road sign is used as the newly-added three-dimensional element to be deleted, and an overpass is located above the road sign, only a top view corresponding to the newly three-dimensional element of the overpass can be seen in the two-dimensional window, and the newly-added three-dimensional element of the road sign is covered by the top view of the overpass. As such, the operator cannot select and delete the road sign in the high-precision map. Based on this, the present disclosure also provides a high-precision map construction method, as shown in FIG. 5, including S501 to S508.

S501, displaying a first color image corresponding to a first track point.

This step is identical with S101. For details, reference can be made to the related description in S101, which will not be repeated here.

S502, according to a first color sub-image and a depth image corresponding to the first track point, obtaining point cloud data corresponding to the first sub-color image.

This step is identical with S102. For details, reference can be made to the related description in S102, which will not be repeated here.

S503, extracting a bounding box corresponding to the point cloud data.

This step is identical with S103. For details, reference can be made to the related description in S103, which will not be repeated here.

S504, generating a newly-added three-dimensional element according to the bounding box in a high-precision map.

This step is identical with S104. For details, reference can be made to the related description in S104, which will not be repeated here.

S505, displaying a two-dimensional image corresponding to the newly-added three-dimensional element in a two-dimensional window.

This step is identical with S405. For details, reference can be made to the related description in S405, which will not be repeated here.

S506, receiving a delete instruction for the two-dimensional image to delete the newly-added three-dimensional element.

This step is identical with S406. For details, reference can be made to the related description in S406, which will not be repeated here.

S507, displaying a three-dimensional image corresponding to the newly-added three-dimensional element in a three-dimensional window.

S508, receiving a delete instruction for the three-dimensional image, to delete the newly-added three-dimensional element.

In S507, the three-dimensional window is a window including a three-dimensional image corresponding to each element in the high-precision map.

As described above, the three-dimensional window may display three-dimensional images, data, and the like corresponding to respective elements in the high-precision map. Since the three-dimensional window displays a three-dimensional image corresponding to each newly-added three-dimensional element, even if a two-dimensional image corresponding to a viewing angle of the newly-added three-dimensional element to be deleted, for example, a plan view is occluded by another newly-added three-dimensional element, the newly-added three-dimensional element can be viewed by switching to another viewing angle of the newly-added three-dimensional element to be deleted in the three-dimensional window.

In S508, when the operator finds that the two-dimensional image is covered in the two-dimensional window, the three-dimensional image corresponding to the newly-added three-dimensional element to be deleted that is cover in the two-dimensional window may be viewed in the three-dimensional window. Further, the three-dimensional image may be selected, and the delete instruction for the three-dimensional image can be input so that the construction program deletes the newly-added three-dimensional element in response to the delete instruction.

According to the embodiment, the newly-added three-dimensional elements of the high-precision map can be deleted preferably through the two-dimensional window; and the three-dimensional window can be displayed when deleting cannot be performed in the two-dimensional window, so that the amount of data to be loaded in deleting the newly three-dimensional elements can be reduced, the newly-added three-dimensional elements can be effectively deleted, thus improving a flexibility in constructing the high-precision map.

Figure 6:
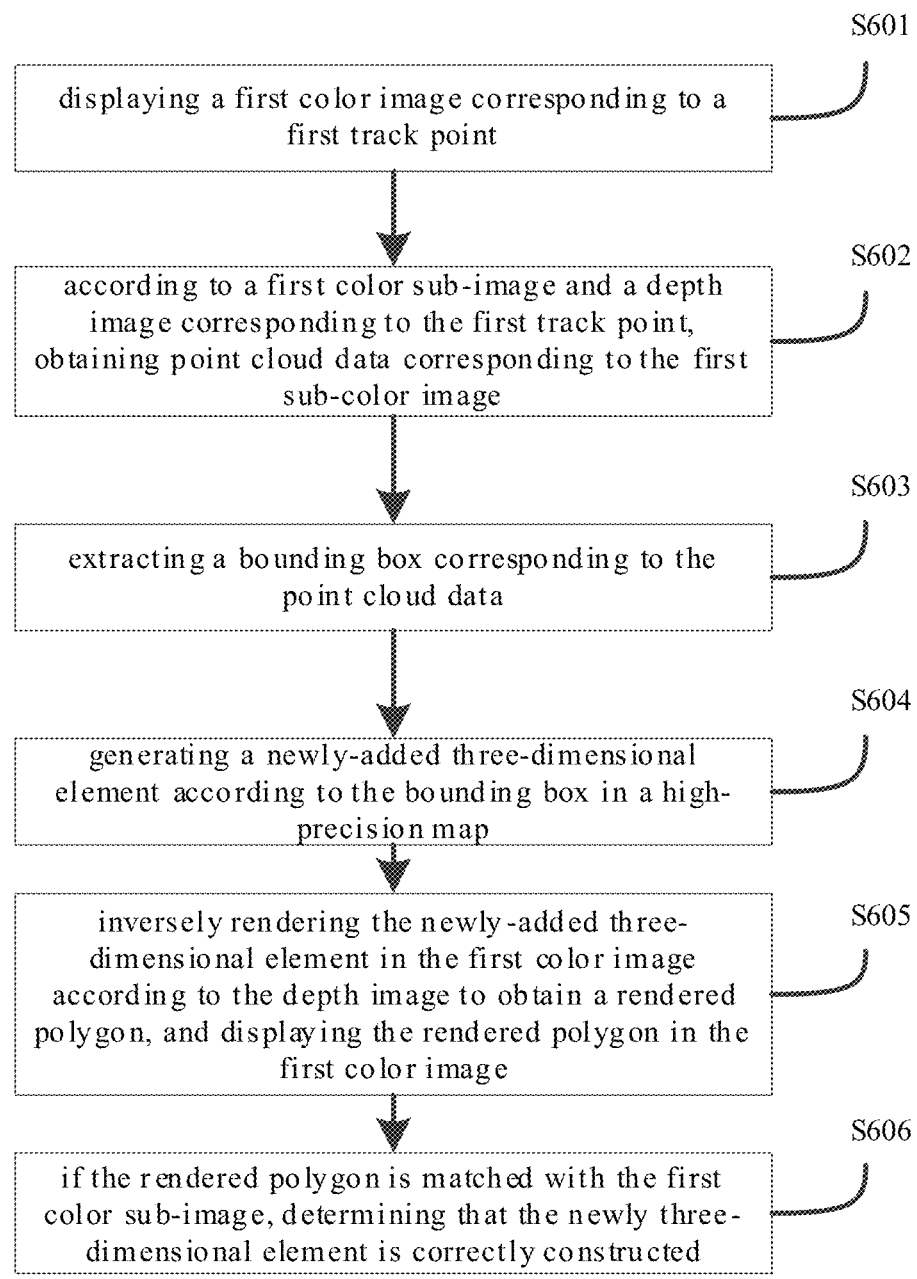
FIG. 6 is a schematic diagram of a high-precision map construction method according to another embodiment the present disclosure.

After preliminary construction of the high-precision map is completed, quality inspection can also be performed on the high-precision map to ensure that each newly-added three-dimensional element can be accurately displayed in the constructed high-precision map. However, when the quality inspection is performed on the high-precision map, the operator needs to determine an accuracy of the high-precision map according to the point cloud data corresponding to each newly-added three-dimensional element. If an edge of the point cloud data is not clear, the operator needs to check the edge of the point cloud data. However, it takes a lot of time to check the edge of the point cloud data. Therefore, it takes a lot of time to check the high-precision map. Based on this, the present disclosure also provides a high-precision map construction method. As shown in FIG. 6, the method includes S601 to S606.

S601, displaying a first color image corresponding to a first track point.

This step is identical with S101. For details, reference can be made to the related description in S101, which will not be repeated here.

S602, according to a first color sub-image and a depth image corresponding to the first track point, obtaining point cloud data corresponding to the first sub-color image.

This step is identical with S102. For details, reference can be made to the related description in S102, which will not be repeated here.

S603, extracting a bounding box corresponding to the point cloud data.

This step is identical with S103. For details, reference can be made to the related description in S103, which will not be repeated here.

S604, generating a newly-added three-dimensional element according to the bounding box in a high-precision map.

This step is identical with S104. For details, reference can be made to the related description in S104, which will not be repeated here.

S605, inversely rendering the newly-added three-dimensional element in the first color image according to the depth image to obtain a rendered polygon, and displaying the rendered polygon in the first color image.

S606, if the rendered polygon is matched with the first color sub-image, determining that the newly three-dimensional element is correctly constructed.

In S605, the operator may select a mark corresponding to a track point to be inspected in the construction program according to a quality inspection requirement. Taking the first track point as an example, the operator selects the first track point and inputs a quality inspection instruction. In response to the quality inspection instruction from the operator to the first track point, the construction program may determine the depth image and the first color image corresponding to the first track point, and inversely render a polygon corresponding to each newly-added three-dimensional element in the first color image according to the depth image and display the rendered polygon. It will be appreciated that the depth image is an image including a color image and a set of sparse point cloud data matched with the color image, and that the depth image of the first track point and the first color image of the first track point have a correspondence. Thus, an edge shape of the point cloud data can be obtained by performing reversely rendering in the first color image according to the depth image, and the edge shape can be used as the rendered polygon.

In S606, as described above, the rendered polygon has been displayed in the first color image, and the first color sub-image has been determined when constructing the newly-added three-dimensional element. Therefore, the operator can view the rendered polygon and the first color sub-image in the first color image in the construction program, and compare the rendered polygon and the first color sub-image. If the rendered polygon is matched with the first color sub-image in shape and size, it indicates that the newly-added three-dimensional element is correctly constructed. The operator can input a color image matching instruction, so that the construction program determines that the newly-added three-dimensional element is correctly constructed in response to the color image matching instruction, and the quality inspection is passed.

According to this embodiment, the quality inspection can be performed on the high-precision map quickly and visually in a two-dimensional image according to the matching result between the polygon and the first color sub-image, thereby improving the accuracy of the high-precision map.

Figure 7:
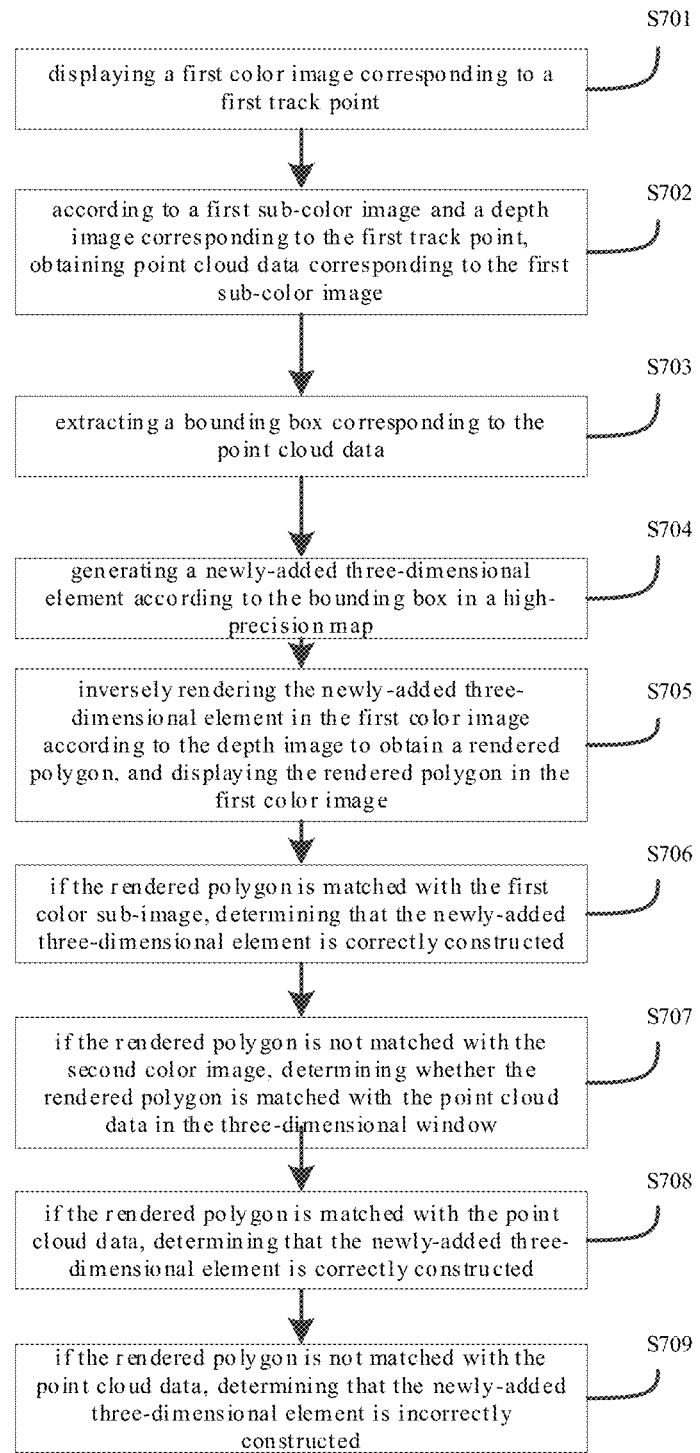
FIG. 7 is a schematic diagram of a high-precision map construction method according to another embodiment the present disclosure.

Accordingly, the operator performs quality inspection on a newly-added three-dimensional element by means of a matching relationship between the polygon and the first color sub-image. If the polygon is not matched with the first color sub-image, it can only be explained that there is a difference between the rendered polygon and the first color sub-image in the two-dimensional space, and it cannot be fully explained that the newly-added three-dimensional element is incorrectly constructed. Based on this, the present disclosure also provides a high-precision map construction method. As shown in FIG. 7, the method includes S701 to S709.

S701, displaying a first color image corresponding to a first track point.

This step is identical with S101. For details, reference can be made to the related description in S101, which will not be repeated here.

S702, according to a first sub-color image and a depth image corresponding to the first track point, obtaining point cloud data corresponding to the first sub-color image.

This step is identical with S102. For details, reference can be made to the related description in S102, which will not be repeated here.

S703, extracting a bounding box corresponding to the point cloud data.

This step is identical with S103. For details, reference can be made to the related description in S103, which will not be repeated here.

S704, generating a newly-added three-dimensional element according to the bounding box in a high-precision map.

This step is identical with S104. For details, reference can be made to the related description in S104, which will not be repeated here.

S705, inversely rendering the newly-added three-dimensional element in the first color image according to the depth image to obtain a rendered polygon, and displaying the rendered polygon in the first color image.

This step is identical with S605. For details, reference can be made to the related description in S605, which will not be repeated here.

S706, if the rendered polygon is matched with the first color sub-image, determining that the newly-added three-dimensional element is correctly constructed.

This step is identical with S606. For details, reference can be made to the related description in S606, which will not be repeated here.

S707, if the rendered polygon is not matched with the second color image, determining whether the rendered polygon is matched with the point cloud data in the three-dimensional window.

S708, if the rendered polygon is matched with the point cloud data, determining that the newly-added three-dimensional element is correctly constructed.

S709, if the rendered polygon is not matched with the point cloud data, determining that the newly-added three-dimensional element is incorrectly constructed.

In S707, the three-dimensional window is a window including a three-dimensional image corresponding to each element in the high-precision map.

As described above, the operator can view the rendered polygon and the first color sub-image in the first color image in the construction program. If the operator determines that the rendered polygon is not matched with the first color sub-image in shape or size, it indicates that the newly-added three-dimensional element may be incorrectly constructed, and further quality inspection is required. The operator can input a color image mismatch instruction so that the construction program displays the three-dimensional window for the further quality inspection. The point cloud data corresponding to the newly-added three-dimensional element may be displayed in three-dimensional window, and the point cloud data is accurate data actually collected. Therefore, when the rendered polygon and the first color sub-image are match with each other in the two-dimensional space, the operator determines the matching result between the rendered polygon and the point cloud data in the three-dimensional window according to the point cloud data, so that it is possible to determine more accurately whether the newly-added three-dimensional element is correctly constructed.

In S708, if the operator determines that the point cloud data and data corresponding to the rendered polygon are matched with each other according to a data relationship and a size relationship therebetween, a point cloud matching instruction is issued, so that the construction program determines that the rendered polygon is matched with the point cloud data in response to the point cloud matching instruction, and further determines that the newly-added three-dimensional element is correctly constructed.

In S709, if the operator determines that the point cloud data and data corresponding to the rendered polygon are not matched with each other according to the data relationship and the size relationship therebetween, the operator sends a point cloud mismatch instruction, so that the construction program determines that the rendered polygon is not matched with the point cloud data in response to the point cloud mismatch instruction, and then determines that the newly-added three-dimensional element is incorrectly constructed.

With this embodiment, it is possible to perform determination on the newly-added three-dimensional elements preferably through the two-dimensional image during quality inspection, and perform further determination on the newly-added three-dimensional element through the three-dimensional window when whether the newly-added three-dimensional element is correctly constructed cannot be determined by the two-dimensional image, thereby avoiding loading unnecessary three-dimensional data and improving the construction efficiency of the high-precision map.

Figure 8:
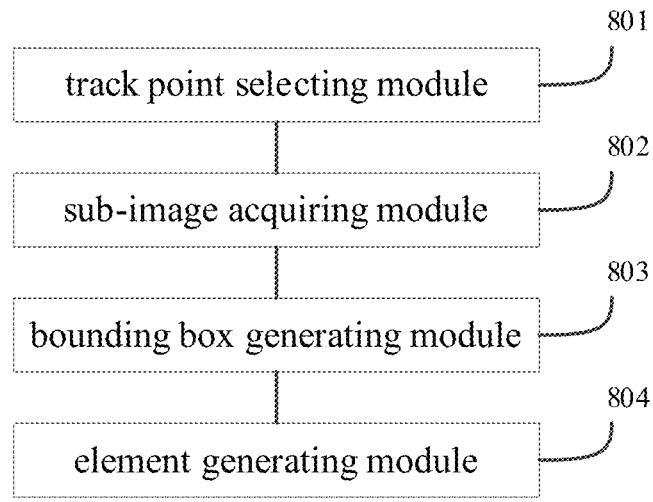
FIG. 8 is a schematic structural diagram of a high-precision map construction apparatus according to the present disclosure.

According to an embodiment of the present disclosure, the present disclosure also provides a high-precision map construction apparatus, as shown in FIG. 8, including:
- a track point selecting module 801, configured to display a first color image corresponding to a first track point, wherein the first track point is a track point selected by a preset selection operation, the track point is a point on an actual road, and a color image corresponding to the track point is a color image captured at the track point;
- a sub-image acquiring module 802, configured to, according to a first color sub-image and a depth image corresponding to the first track point, obtain point cloud data corresponding to the first sub-color image, wherein the first sub-color image is a sub-image corresponding to an element to be added in the first color image, and the element to be added is an element to be added in a high-precision map for display;
- a bounding box generating module 803, configured to extract a bounding box corresponding to the point cloud data; and
- an element generating module 804, configured to generate a newly-added three-dimensional element according to the bounding box in the high-precision map.

In a possible embodiment, the apparatus further comprises:
- a second sub-image determining module configured to determine a second color sub-image, wherein the second color sub-image is an image, of the element to be added, displayed in a second color image corresponding to a second track point, and the second track point is a track point adjacent to the first locus point;
- a polygon obtaining module configured to display a polygon, obtained according to the depth image, of the bounding box in the second color image;
- a polygon determining module, configured to receive a confirmation instruction for the polygon, the confirmation instruction indicating whether the second color sub-image is matched with or is not match with the polygon; and
- an element editing module, configured to, if the second color sub-image is not matched with the polygon, receive an edit instruction for the newly-added three-dimensional element.

In a possible embodiment, the apparatus further comprises:
- a two-dimensional window displaying module, configured to display a two-dimensional image corresponding to the newly-added three-dimensional element and an attribute panel corresponding to the newly-added three-dimensional element in a two-dimensional window, wherein the two-dimensional window is a two-dimensional map window corresponding to the high-precision map; and
- a bounding box adjusting module, configured to receive a bounding box adjusting instruction through the attribute panel, and adjust the bounding box according to the bounding box adjusting instruction to obtain an adjusted bounding box, wherein the adjusted bounding box is a bounding box that coincides with the point cloud data in position in a three-dimensional window, and the three-dimensional window is a window containing three-dimensional images each corresponding to an element in the high-precision map; and
- an element modifying module, configured to modify data corresponding to the newly-added three-dimensional element according to the adjusted bounding box.

In a possible embodiment, the apparatus further comprises:
- a two-dimensional image displaying module, configured to display a two-dimensional image corresponding to the newly-added three-dimensional element in a two-dimensional window, wherein the two-dimensional window is a two-dimensional map window corresponding to the high-precision map; and
- a two-dimensional image deleting module, configured to receive a delete instruction for the two-dimensional image to delete the newly-added three-dimensional element.

In a possible embodiment, the apparatus further comprises:
- a three-dimensional window displaying module, configured to display a three-dimensional image corresponding to the newly-added three-dimensional element in a three-dimensional window, wherein the three-dimensional window is a window containing three-dimensional images each corresponding to an element in the high-precision map; and
- a three-dimensional image deleting module, configured to receive a delete instruction for the three-dimensional image, to delete the newly-added three-dimensional element.

In a possible embodiment, the apparatus further comprises:
- a quality inspecting module, configured to inversely render the newly-added three-dimensional element in the first color image according to the depth image to obtain a rendered polygon, and displaying the rendered polygon in the first color image; and
- a color image matching module, configured to, if the rendered polygon is matched with the first color sub-image, determine that the newly three-dimensional element is correctly constructed.

In a possible embodiment, the apparatus further comprises:
- a point cloud data matching module, configured to, if the rendered polygon is not matched with the second color image, determine whether the rendered polygon is matched with the point cloud data in the three-dimensional window, wherein the three-dimensional window is a window containing three-dimensional images each corresponding to an element in the high-precision map;
- an element correctly-constructing module, configured to, if the rendered polygon is matched with the point cloud data, determine that the newly-added three-dimensional element is correctly constructed; and
- an element incorrectly-constructing module, configured to, if the rendered polygon is not matched with the point cloud data, determine that the newly-added three-dimensional element is incorrectly constructed.

According to an embodiment of the present disclosure, the present disclosure also provides an electronic device, a readable storage medium, and a computer program product.

Figure 9:
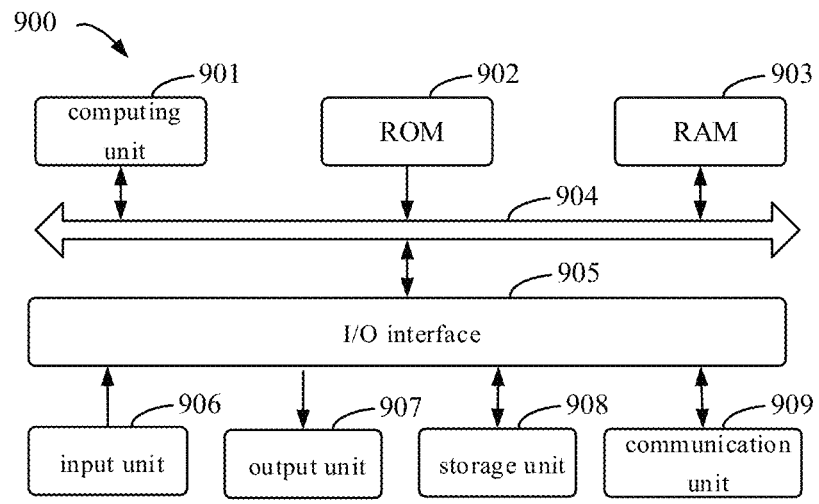
FIG. 9 is a block diagram of an electronic device used to implement the high-precision map construction method of an embodiment of the present disclosure.

FIG. 9 illustrates a schematic block diagram of an example electronic device 900 that may be used to implement embodiments of the present disclosure. Electronic devices are intended to represent various forms of digital computers, such as laptop computers, desktop computers, worktables, personal digital assistants, servers, blade servers, mainframe computers, and other suitable computers. Electronic devices may also represent various forms of mobile devices, such as personal digital processing, cellular telephones, smart phones, wearable devices, and other similar computing devices. The components shown herein, their connections and relationships, and their functions are by way of example only and are not intended to limit the implementation of the disclosure described and/or claimed herein.

As shown in FIG. 9, the device 900 includes a computing unit 901, which may perform various appropriate actions and processes according to a computer program stored in a read-only memory (ROM) 902 or a computer program loaded into a random access memory (RAM) 903 from a storage unit 908. In RAM 903, various programs and data required for operation of the device 900 may also be stored. The computing units 901, ROM 902 and RAM 903 are connected to each other via a bus 904. An input/output (I/O) interface 905 is also connected to bus 904.

A plurality of components in the device 900 are connected to the I/O interface 905, including an input unit 906, such as a keyboard, a mouse, and the like: an output unit 907, for example, various types of displays, speakers, and the like: a storage unit 908, such as a magnetic disk, an optical disk, or the like; and a communication unit 909, such as a network card, a modem, or a wireless communication transceiver. the communication unit 909 allows the device 900 to exchange information/data with other devices over a computer network such as the internet and/or various telecommunications networks.

The computing unit 901 may be various general-purpose and/or special-purpose processing components having processing and computing capabilities. Some examples of computing units 901 include, but are not limited to, central processing units (CPUs), graphics processing units (GPUs), various specialized artificial intelligence (AI) computing chips, various computing units running machine learning model algorithms, digital signal processors (DSPs), and any suitable processors, controllers, microcontrollers, and the like. The computing unit 901 performs various methods and processes described above, such as a high-precision map construction method. For example, in some embodiments, the high-precision map construction method may be implemented as a computer software program tangibly embodied in a machine-readable medium, such as storage unit 908. In some embodiments, some or all of the computer program may be loaded and/or installed on the device 900 via the ROM 902 and/or the communication unit 909. When the computer program is loaded into the RAM 903 and executed by the computing unit 901, one or more steps of the high-precision map construction method described above may be performed. Alternatively, in other embodiments, the computing unit 901 may be configured to perform a high-precision map construction method by any other suitable means (e.g., by means of firmware).

The various embodiments of the systems and techniques described above herein may be implemented in digital electronic circuit systems, integrated circuit systems, field programmable gate arrays (FPGAs), application specific integrated circuits (ASICs), application specific standard products (ASSP), systems on a chip (SOC), complex programmable logic devices (CPLDs), computer hardware, firmware, software, and/or combinations thereof. These various embodiments may include being implemented in one or more computer programs that may execute and/or interpret on a programmable system including at least one programmable processor, which may be a dedicated or general purpose programmable processor, may receive data and instructions from a memory system, at least one input device, and at least one output device, and transmit the data and instructions to the memory system, the at least one input device, and the at least one output device.

The program code for carrying out the methods of the present disclosure may be written in any combination of one or more programming languages. These program codes may be provided to a processor or controller of a general purpose computer, special purpose computer, or other programmable data processing apparatus such that the program code, when executed by the processor or controller, causes the functions/operations specified in the flowchart and/or block diagram to be implemented. The program code may be executed entirely on the machine, partly on the machine, partly on the machine as a stand-alone software package and partly on the remote machine or entirely on the remote machine or server.

In the context of the present disclosure, a machine-readable medium may be a tangible medium that may contain or store a program for use by or in connection with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, devices, or devices, or any suitable combination of the foregoing. More specific examples of machine-readable storage media may include one or more line-based electrical connections, portable computer disks, hard disks, random access memory (RAM), read-only memory (ROM), erasable programmable read-only memory (EPROM or flash memory), optical fibers, portable compact disk read-only memory (CD-ROM), optical storage devices, magnetic storage devices, or any suitable combination of the foregoing.

To provide interaction with a user, the systems and techniques described herein may be implemented on a computer having a display device (e.g., a CRT (cathode ray tube) or LCD (liquid crystal display) monitor) for displaying information to the user; and a keyboard and a pointing device (e.g., a mouse or a trackball) through which a user can provide input to a computer. Other types of devices may also be used to provide interaction with a user: for example, the feedback provided to the user may be any form of sensory feedback (e.g., visual feedback, auditory feedback, or tactile feedback); and input from the user may be received in any form, including acoustic input, speech input, or tactile input.

The systems and techniques described herein may be implemented in a computing system including a background component (e.g., as a data server), or a computing system including a middleware component (e.g., an application server), or a computing system including a front-end component (e.g., a user computer having a graphical user interface or a web browser through which a user may interact with embodiments of the systems and techniques described herein), or a computing system including any combination of such background component, middleware component, or front-end component. The components of the system may be interconnected by any form or medium of digital data communication (e.g., a communication network). Examples of communication networks include a local area network (LAN), a wide area network (WAN), and the Internet.

The computer system may include a client and a server. The client and server are typically remote from each other and typically interact through a communication network. The relationship between the client and the server is generated by a computer program running on the corresponding computer and having a client-server relationship with each other. The server may be a cloud server, a server of a distributed system, or a server incorporating a chain of blocks.

It is to be understood that the steps of reordering, adding or deleting may be performed using the various forms shown above. For example, the steps described in the present disclosure may be performed in parallel or sequentially or in a different order, so long as the desired results of the technical solution disclosed in the present disclosure can be realized, and no limitation is imposed herein.

The foregoing detailed description is not intended to limit the scope of the present disclosure. It will be appreciated by those skilled in the art that various modifications, combinations, sub-combinations, and substitutions may be made depending on design requirements and other factors. Any modifications, equivalents, and modifications that fall within the spirit and principles of the disclosure are intended to be included within the scope of protection of the disclosure.

What is claimed is:

1. A high-precision map construction method comprising:
    displaying a first color image corresponding to a first track point, wherein the first track point is a track point selected by a preset selection operation, the track point is a point on an actual road, and a color image corresponding to the track point is a color image captured at the track point;
    obtaining, on basis of a first color sub-image and a depth image corresponding to the first track point, point cloud data corresponding to the first color sub-image, wherein the first color sub-image is a sub-image corresponding to an element to be added in the first color image, and the element to be added is an element to be added in a high-precision map for display;
    extracting a three-dimensional bounding box corresponding to the point cloud data; generating, in the high-precision map, a newly-added three-dimensional element according to the three-dimensional bounding box corresponding to the first color sub-image;
    determining a second color sub-image in a second color image corresponding to a second track point, wherein the second color sub-image is an image of the element to be added in the second color image, and the second track point is a track point adjacent to the first track point;
    displaying, in the second color image, a two-dimensional polygon, wherein the two-dimensional polygon is obtained on basis of the three-dimensional bounding box corresponding to the first color sub-image according to the depth image; and
    in response to receiving a confirmation instruction indicating that the second color sub-image does not match with the two-dimensional polygon, receiving, through a two-dimensional window, an edit instruction for editing the newly-added three-dimensional element in a three-dimensional window, and editing the newly-added three-dimensional element in the three-dimensional window according to the editing instruction received through the two-dimensional window.

2. The method of claim 1, wherein the two-dimensional window is a two-dimensional map window displaying a two-dimensional map corresponding to the high-precision map, and the three-dimensional window displays three-dimensional images corresponding to respective elements in the high-precision map, the point cloud data and the three-dimensional bounding box.

3. The method of claim 2, wherein the receiving, through the two-dimensional window, the edit instruction for editing the newly-added three-dimensional element in the three-dimensional window, and editing the newly-added three-dimensional element in the three-dimensional window according to the editing instruction received through the two-dimensional window, comprises:
    displaying, in the two-dimensional window, a two-dimensional image corresponding to the newly-added three-dimensional element and an attribute panel corresponding to the newly-added three-dimensional;
    receiving a bounding box adjusting instruction through the attribute panel, and adjusting the three-dimensional bounding box according to the bounding box adjusting instruction to obtain an adjusted three-dimensional bounding box, wherein the adjusted three-dimensional bounding box coincides with the point cloud data in the three-dimensional window; and
    modifying data corresponding to the newly-added three-dimensional element according to the adjusted three-dimensional bounding box.

4. The method of claim 1, further comprising:
    displaying, in the two-dimensional window, a two-dimensional image corresponding to the newly-added three-dimensional element, wherein the two-dimensional window is a two-dimensional map window displaying a two-dimensional map corresponding to the high-precision map; and
    receiving a delete instruction for the two-dimensional image, and deleting the newly-added three-dimensional element.

5. The method of claim 4, further comprising:
    displaying, in the three-dimensional window, a three-dimensional image corresponding to the newly-added three-dimensional element, wherein the three-dimensional window is a window displaying three-dimensional images corresponding to respective elements in the high-precision map; and
    receiving the delete instruction for the three-dimensional image, and deleting the newly-added three-dimensional element.

6. The method of claim 1, further comprising:
    inversely rendering the newly-added three-dimensional element in the first color image according to the depth image to obtain a rendered polygon, and displaying the rendered polygon in the first color image; and
    in response to determining that the rendered polygon matches with the first color sub-image, determining that the newly-added three-dimensional element is correctly constructed.

7. The method of claim 6, further comprising:
    in response to determining that the rendered polygon does not match with the first color sub-image, determining whether the rendered polygon matches with the point cloud data in the three-dimensional window, wherein the three-dimensional window is a window displaying three-dimensional images corresponding to respective elements in the high-precision map;

in response to determining that the rendered polygon matches with the point cloud data, determining that the newly-added three-dimensional element is correctly constructed; and in response to determining that the rendered polygon does not match with the point cloud data, determining that the newly-added three-dimensional element is incorrectly constructed.

8. A high-precision map construction apparatus comprising:

at least one processor; and a memory storing instructions, wherein the instructions, when executed by the at least one processor, cause the at least one processor to perform operations, the operations comprising:

displaying a first color image corresponding to a first track point, wherein the first track point is a track point selected by a preset selection operation, the track point is a point on an actual road, and a color image corresponding to the track point is a color image captured at the track point;

obtaining, on basis of a first color sub-image and a depth image corresponding to the first track point, point cloud data corresponding to the first color sub-image, wherein the first color sub-image is a sub-image corresponding to an element to be added in the first color image, and the element to be added is an element to be added in a high-precision map for display;

extracting a three-dimensional bounding box corresponding to the point cloud data;

generating, in the high-precision map, a newly-added three-dimensional element according to the three-dimensional bounding box corresponding to the first color sub-image;

determining a second color sub-image in a second color image corresponding to a second track point, wherein the second color sub-image is an image of the element to be added in the second color image, and the second track point is a track point adjacent to the first track point;

displaying, in the second color image, a two-dimensional polygon, wherein the two-dimensional polygon is obtained on basis of the three-dimensional bounding box corresponding to the first color sub-image according to the depth image; and in response to receiving a confirmation instruction indicating that the second color sub-image does not match with the two-dimensional polygon, receiving, through a two-dimensional window, an edit instruction for editing the newly-added three-dimensional element in a three-dimensional window, and editing the newly-added three-dimensional element in the three-dimensional window according to the editing instruction received through the two-dimensional window.

9. The apparatus of claim 8, wherein the two-dimensional window is a two-dimensional map window displaying a two-dimensional map corresponding to the high-precision map, and the three-dimensional window displays three-dimensional images corresponding to respective elements in the high-precision map, the point cloud data and the three-dimensional bounding box.

10. The apparatus of claim 9, wherein the receiving, through the two-dimensional window, the edit instruction for editing the newly-added three-dimensional element in the three-dimensional window, and editing the newly-added three-dimensional element in the three-dimensional window according to the editing instruction received through the two-dimensional window, comprises:

displaying, in the two-dimensional window, a two-dimensional image corresponding to the newly-added three-dimensional element and an attribute panel corresponding to the newly-added three-dimensional element;

receiving a bounding box adjusting instruction through the attribute panel, and adjusting the three-dimensional bounding box according to the bounding box adjusting instruction to obtain an adjusted three-dimensional bounding box, wherein the adjusted three-dimensional bounding box coincides with the point cloud data in the three-dimensional window; and modifying data corresponding to the newly-added three-dimensional element according to the adjusted three-dimensional bounding box.

11. The apparatus of claim 8, the operations further comprising:

displaying, in the two-dimensional window, a two-dimensional image corresponding to the newly-added three-dimensional element, wherein the two-dimensional window is a two-dimensional map window displaying a two-dimensional map corresponding to the high-precision map; and receiving a delete instruction for the two-dimensional image, and deleting the newly-added three-dimensional element.

12. The apparatus of claim 11, the operations further comprising:

displaying, in the three-dimensional window, a three-dimensional image corresponding to the newly-added three-dimensional element, wherein the three-dimensional window is a window displaying three-dimensional images corresponding to respective elements in the high-precision map; and receiving the delete instruction for the three-dimensional image, and deleting the newly-added three-dimensional element.

13. The apparatus of claim 8, the operations further comprising:

inversely rendering the newly-added three-dimensional element in the first color image according to the depth image to obtain a rendered polygon, and displaying the rendered polygon in the first color image; and in response to determining that the rendered polygon matches with the first color sub-image, determining that the newly-added three-dimensional element is correctly constructed.

14. The apparatus of claim 13, the operations further comprising:

in response to determining that the rendered polygon does not match with the first color sub-image, determining whether the rendered polygon is matched with matches with the point cloud data in the three-dimensional window, wherein the three-dimensional window is a window displaying three-dimensional images corresponding to respective elements in the high-precision map;

an element correctly-constructing module, configured to, in response to determining that the rendered polygon matches with the point cloud data, determine that the newly-added three-dimensional element is correctly constructed; and an element incorrectly-constructing module, configured to, in response to determining that the rendered polygon does not match with the point cloud data, determine that the newly-added three-dimensional element is incorrectly constructed.

15. A non-transitory computer readable storage medium storing computer instructions, wherein the computer instructions are configure to cause a computer to execute operations comprising:

displaying a first color image corresponding to a first track point, wherein the first track point is a track point selected by a preset selection operation, the track point is a point on an actual road, and a color image corresponding to the track point is a color image captured at the track point;

obtaining, on basis of a first color sub-image and a depth image corresponding to the first track point, point cloud data corresponding to the first color sub-image, wherein the first color sub-image is a sub-image corresponding to an element to be added in the first color image, and the element to be added is an element to be added in a high-precision map for display;

extracting a three-dimensional bounding box corresponding to the point cloud data;

generating, in the high-precision map, a newly-added three-dimensional element according to the three-dimensional bounding box corresponding to the first color sub-image;

determining a second color sub-image in a second color image corresponding to a second track point, wherein the second color sub-image is an image of the element to be added in the second color image, and the second track point is a track point adjacent to the first track point;

displaying, in the second color image, a two-dimensional polygon, wherein the two-dimensional polygon is obtained on basis of the three-dimensional bounding box corresponding to the first color sub-image according to the depth image; and in response to receiving a confirmation instruction indicating that the second color sub-image does not match with the two-dimensional polygon, receiving, through a two-dimensional window, an edit instruction for editing the newly-added three-dimensional element in a three-dimensional window, and editing the newly-added three-dimensional element in the three-dimensional window according to the editing instruction received through the two-dimensional window.

16. The non-transitory computer readable storage medium of claim 15, wherein the two-dimensional window is a two-dimensional map window displaying a two-dimensional map corresponding to the high-precision map, and the three-dimensional window displays three-dimensional images corresponding to respective elements in the high-precision map, the point cloud data and the three-dimensional bounding box.

17. The non-transitory computer readable storage medium of claim 16, wherein the receiving, through the two-dimensional window, the edit instruction for editing the newly-added three-dimensional element in the three-dimensional window, and editing the newly-added three-dimensional element in the three-dimensional window according to the editing instruction received through the two-dimensional window, comprises:

displaying, in the two-dimensional window, a two-dimensional image corresponding to the newly-added three-dimensional element and an attribute panel corresponding to the newly-added three-dimensional element;

receiving a bounding box adjusting instruction through the attribute panel, and adjusting the three-dimensional bounding box according to the bounding box adjusting instruction to obtain an adjusted three-dimensional bounding box, wherein the adjusted three-dimensional bounding box coincides with the point cloud data in the three-dimensional window; and modifying data corresponding to the newly-added three-dimensional element according to the adjusted three-dimensional bounding box.

18. The non-transitory computer readable storage medium of claim 15, the operations further comprising:

displaying, in the two-dimensional window, a two-dimensional image corresponding to the newly-added three-dimensional element, wherein the two-dimensional window is a two-dimensional map window displaying a two-dimensional map corresponding to the high-precision map; and receiving a delete instruction for the two-dimensional image, and deleting the newly-added three-dimensional element.

19. The non-transitory computer readable storage medium of claim 18, the operations further comprising:

displaying, in the three-dimensional window, a three-dimensional image corresponding to the newly-added three-dimensional element, wherein the three-dimensional window is a window displaying three-dimensional images corresponding to respective elements in the high-precision map; and receiving the delete instruction for the three-dimensional image, and deleting the newly-added three-dimensional element.

20. The non-transitory computer readable storage medium of claim 15, the operations further comprising:

inversely rendering the newly-added three-dimensional element in the first color image according to the depth image to obtain a rendered polygon, and displaying the rendered polygon in the first color image; and in response to determining that the rendered polygon matches with the first color sub-image, determining that the newly-added three-dimensional element is correctly constructed.

* * * * *